United States Patent
Sasaki et al.

(12)
(10) Patent No.: US 6,385,218 B1
(45) Date of Patent: May 7, 2002

(54) LASER PROCESSING APPARATUS

(75) Inventors: Haruki Sasaki; Kouji Kawamura, both of Chiba-ken (JP)

(73) Assignee: Miyachi Technos Corporation, Chiba-Ken (JP)

( * ) Notice: Subject to any disclaimer, the term of this patent is extended or adjusted under 35 U.S.C. 154(b) by 0 days.

(21) Appl. No.: 09/252,771

(22) Filed: Feb. 19, 1999

(30) Foreign Application Priority Data

Feb. 24, 1998 (JP) .......................................... 10-059012

(51) Int. Cl.⁷ ................................................. H01S 3/10
(52) U.S. Cl. ..................... 372/25; 372/38.02; 372/38.06
(58) Field of Search .............................. 372/38.02, 25, 372/30; 219/121.6, 121.67, 121.72, 121.61, 121.62, 121.73; 700/166

(56) References Cited

U.S. PATENT DOCUMENTS

| | | | | |
|---|---|---|---|---|
| 5,111,023 A | * | 5/1992 | Horibe | 219/121.85 |
| 5,151,909 A | * | 9/1992 | Davenport | 372/22 |
| 5,283,794 A | * | 2/1994 | Gibbs | 372/30 |
| 5,347,528 A | * | 9/1994 | Haruta | 372/25 |
| 5,580,470 A | * | 12/1996 | Enokizono | 219/121.6 |
| 5,986,252 A | * | 11/1999 | Kawamura | 250/205 |

* cited by examiner

*Primary Examiner*—Quyen Leung
*Assistant Examiner*—Gioacchino Inzirillo
(74) *Attorney, Agent, or Firm*—Wenderoth, Lind & Ponack, L.L.P.

(57) ABSTRACT

On a "schedule" screen appearing on a display the user performs desired set value entries or action instructions on the apparatus by means of key entries. In order to set and enter a reference waveform for waveform control in particular, desired numerical value data are set and entered into items of a laser output reference value PEAK and waveform elements ↑ SLOPE, FLASH1, FLASH2, FLASH3 and ↓ SLOPE. Within the interior of the apparatus the reference waveform for waveform control and a reference waveform graph for display are obtained on the basis of the entered set values of the waveform element items. The reference waveform for waveform control is used as a reference value for the waveform control in the laser output waveform control. The reference waveform graph for display appears in a predetermined area on the screen in response to a predetermined key action.

13 Claims, 18 Drawing Sheets

[SCHEDULE SCREEN] (1st SETTING MODE)

```
-SCH.#03  [FORM:FIX]~20.0J WATER 28°C
 ⊬:OFF  PEAK=10.00kW   REPEAT=500pps
 ↑SLOPE 01.0ms          SHOT  =9999
  FLASH1 01.0ms 100.0%  HIGH  999.9J
  FLASH2 01.5ms 025.0%  LOW   000.0J
  FLASH3 03.0ms 050.0%
 ↓SLOPE 01.0ms
  HV:OFF  MAIN SHUTTER:OFF  POSITION:OFF
```
(GRAPH OFF)

↕

(GRAPH ON)

```
-SCH.#03  [FORM:FIX]~20.0J WATER 28°C
 ⊬:ON   PEAK=10.00kW   %
 ↑SLOPE 01.0ms
  FLASH1 01.0ms 100.0%
  FLASH2 01.5ms 025.0%
  FLASH3 03.0ms 050.0%
 ↓SLOPE 01.0ms                        ms
  HV:OFF  MAIN SHUTTER:OFF  POSITION:OFF
```

[ SCHEDULE SCREEN ]   (1st SETTING MODE)

( GRAPH OFF )

( GRAPH ON )

[SCHEDULE SCREEN] (2nd SETTING MODE)

(GRAPH OFF)

(GRAPH ON)

FIG.8

[ STATUS SCREEN ]

```
-STATUS   [PANEL CONTROL]      WATER  28 ℃
 BEAM-1:OFF   RESET SELECT      PRESET
 BEAM-2:OFF  →SHOT  123456789  123456789
 BEAM-3:OFF  →GOOD  123456789  123456789
 BEAM-4:OFF          CONTROL:[LASER POWER]
 BEAM-5:OFF          POSITION BLINK:OFF
 BEAM-6:OFF          FIBER:[SI]  φ0.0mm
 HV:OFF   MAIN SHUTTER:OFF   POSITION:OFF
```

FIG.9

[ POWER MONITOR SCREEN ]

```
-POWER MONITOR SCH.#00 MW:ON    WATER 28℃
 ENERGY     12.5J    w|
 AVERAGE   312.5W
 SHOT COUNT  123456789
 GOOD COUNT  123456789                    ms
 HV:OFF   MAIN SHUTTER:OFF   POSITION:OFF
```

| | | |
|---|---|---|
| | ⋮ | ⎯ 100 |
| A₁ | " 03 " | (SCH.#) |
| A₂ | " FIX " | (FORM) |
| A₃ | " OFF " | ($\omega$) |
| A₄ | " 10.00 " (kW) | (PEAK) |
| A₅ | " 500 " (pps) | (REPEAT) |
| A₆ | " 0.1 " (ms) | (↑SLOPE) |
| A₇ | " 9999 " | (SHOT) |
| A₈ | " 01.0 " (ms) | ⎫ (FLASH 1) |
| A₉ | " 100 " (%) | ⎭ |
| | ⋮ | |

PEAK = 10.00 (kW)

PEAK = 12.00 (kW)

```
-SCH.#[15] TIME VOLT ENERGY    WATER 28°C
 FLASH1 [05.0]ms [A] HIGH  [999.9]J
 COOL1  [06.0]ms     LOW   [000.0]J    AVERAGE
 FLASH2 [07.0]ms [B] MON.   0.0 J      50.0 W
 COOL2  [06.0]ms     TOTAL COUNT_ 12345678
 FLASH3 [08.0]ms [A] GOOD  COUNT  12345678
  A=[300]V  B=[500]V [200]pps [9999]shot DMY=[999]
 HV:[OFF]  MAIN SHUTTER:[OFF]  POSITION:[OFF]
```

LASER PROCESSING APPARATUS

BACKGROUND OF THE INVENTION

1. Field of the Invention

The present invention relates to a waveform control type laser processing apparatus.

2. Description of the Related Arts

In a laser processing apparatus which imparts pulse laser beams onto a workpiece to perform laser processing such as welding or cutting, use has hitherto been made of a technique for variably controlling a waveform of a laser power of the pulse laser beams or a waveform of a predetermined electrical parameter corresponding thereto, so as to be able to deal with various processing demands.

In the case of such a waveform control system, a desired reference waveform for waveform control is previously set and entered into the laser processing apparatus. The laser processing apparatus comprises a laser oscillation unit which oscillates and outputs laser beams in response to a supply of electric power from a laser power supply unit, and a laser control which provides a control of the laser power supply unit in an open loop control system or a closed loop (feedback) control system in such a manner as to allow a change with respect to time, i.e., a waveform of a laser power of the laser beams oscillated and output from the laser oscillation unit or a waveform of a predetermined electrical parameter of the laser power supply unit to conform to the reference waveform.

Reference is made to FIGS. 21 to 23 to describe a typical method of setting the reference waveform in the conventional laser processing apparatus of this type.

The conventional apparatus has a setting mode screen as shown in FIG. 21 on which a plurality of, e.g., three flash periods FLASH1, FLASH2, FLASH3 and two cooling periods COOL1, COOL2 are prepared as waveform element items for defining a reference waveform for a single pulse laser beam.

Desired time within a predetermined range (e.g., 0 to 20 ms) is set and entered into the flash periods FLASH, with a selection of the laser power value from one of two different modes [A, B]. Herein the laser power value modes [A, B] are represented as set voltages within the laser power supply unit corresponding to the laser power and are set to desired voltage values in the separate setting items on the same setting mode screen. In the shown example, setting is made of A=300V and B=500V. Time within a predetermined range (e.g., 0 to 20 ms) is only set and entered into the cooling periods COOL.

FIG. 22 illustrates a wave form pattern of the reference waveform corresponding to the set value of FIG. 21. FIGS. 23A to 23D illustrates other examples of the reference waveform pattern. Ordinary applications often employ a single pulse waveform by continuously connecting a plurality of flash periods FLASH without inserting any cooling periods COOL as in the examples of FIGS. 23A–D.

It is to be noted in FIG. 21 that for easier illustration dotted lines encloses items which can be set and entered on the setting screen mode. No description is given to items having no direct relation to the setting of the reference waveform.

In the conventional laser processing apparatus, as set forth hereinabove, the user (operator) previously sets desired values of a plurality of different laser power value modes [A, B] to allocate either one of the laser power value modes to each flash period, thereby setting the reference waveform for laser power waveform control.

In the case of such a setting system, if the number of the laser power value modes is small, for example, two [A, B], the type of the reference waveform pattern which can be set is also limited, making it difficult to deal with a diversity of workpieces.

An increase in the number of the laser power value modes to solve this problem will in turn result in complicated setting entry operations, adding to the burden of the user side.

In particular the same or similar reference waveform pattern is often selected for workpieces of the same material, although a change of thickness of the workpieces needs a change of laser power value in spite of the same material. For example, increase of the thickness results in increase of the laser power value.

In this respect, to increase by e.g., 15% in total the laser power value of the reference waveform with the same waveform pattern, the above conventional laser processing apparatus requires the user to figure out by himself/herself a 15% increase value (new set value) for each of the laser power value modes [A, B] and to enter the thus obtained new set value on the setting mode screen (FIG. 21). This results in troublesome operation even in the case of a change of a single laser power value mode.

As described above, however, an increase in the number of the laser power value modes to add to the degree of freedom of the reference waveform pattern brings about a further increase in the inconvenience of the user operation.

In addition the conventional laser processing apparatus did not display any waveform pattern of the thus set reference waveform on the screen, so that the user had to imagine an ideal waveform diagram in his/her mind from the set values of the waveform element items or alternatively, the user had to actually draw a waveform diagram on paper, which was a cause of more time taker to set of alter the reference waveform.

Furthermore, it was inconveniently impossible to adjust at will the heating rate or cooling rate in the laser processing since the leading edge and the trailing edge of the reference waveform were set only perpendicularly with no inclination.

SUMMARY OF THE INVENTION

The present invention was conceived in view of the above problems involved in the prior art. It is therefore an object of the present invention to provide a laser processing apparatus capable of setting a reference waveform for waveform control of a laser output or an electrical parameter corresponding thereto, in the form of a diversity of waveform patterns, through a simple user operation.

Another object of the present invention is to provide a laser processing apparatus allowing an easy and free alteration of the once set reference waveform for waveform control.

A further object of the present invention is to provide a laser processing apparatus enabling the rise/fall of a laser output waveform to be set to arbitrary waveforms and ensuring any desired adjustment of the heating rate or cooling rate in the laser processing.

In order to achieve the above objects, according to an aspect of the present invention, there is provided a laser processing apparatus comprising laser oscillation means for oscillating and outputting pulse laser beams; laser power supply means for supplying an electric power for laser oscillation to the laser oscillation means; and reference value setting means for setting reference values for laser outputs of the pulse laser beams or for electrical parameters of the laser power supply means corresponding thereto. The laser processing apparatus also comprising waveform section setting means for setting, as values of ratio relative to the reference values, laser output values or electrical parameter values of a plurality of waveform sections for constituting a reference waveform used for the waveform control for the laser outputs of the pulse laser beams and the electric parameters; reference waveform generation means for generating waveform data representative of the reference waveform on the basis of reference values which have been set by the reference value setting means and of ratios relative to the reference values of waveform sections which have been set by the waveform section setting means; and waveform control means for providing a control of the laser power supply means in such a manner that the laser outputs of the pulse laser beams or the electric parameters conform to the reference waveform imparted by the reference waveform generation means.

In the laser processing apparatus the reference waveform generation means preferably include upslope generation means for acquiring an upslope waveform section of the reference waveform from time of the first period among the plurality of periods and from time and a laser output ratio or an electrical parameter ratio of the second period and from the reference value.

In the laser processing apparatus the reference waveform generation means may include downslope generation means for acquiring a downslope waveform section of the reference waveform from time and a laser output ratio or an electrical parameter ratio of the second last period among the plurality of periods and from the reference value and from time of the last period.

Preferably the laser processing apparatus further comprises set value display means for displaying the reference value and set values of the time, laser output ratio or electrical parameter ratio of the period.

Preferably the laser processing apparatus further comprises reference waveform graph display means for displaying a reference waveform graph representative of a waveform pattern of the reference waveform.

In the laser processing apparatus the reference waveform graph display means may acquire the reference waveform graph on the basis of times of a plurality of periods which have been set by the pulse period setting means, and of a laser output ratio or an electrical parameter ratio of each period which has been set by the ratio setting means.

In the laser processing apparatus the waveform section setting means may include pass point time setting means for setting times of a plurality of pass points on a waveform of the reference waveform, and ratio setting means for setting a laser output value or an electrical parameter value of each of the pass points in the form of a value of ratio relative to the reference value.

In the laser processing apparatus the reference waveform generation means preferably include upslope generation means for acquiring an upslope waveform section of the reference waveform from time and a laser output ratio or an electrical parameter ratio of the first point among the plurality of pass points and from the reference value.

In the laser processing apparatus the reference waveform generation means preferably include downslope generation means for acquiring a downslope waveform section of the reference waveform from time and a laser output ratio or an electrical parameter ratio of the second last point among the plurality of pass points and from time of the last point and from the reference value.

Preferably the laser processing apparatus further comprises set value display means for displaying the laser output reference value and set values of the time, laser output ratio or electrical parameter ratio of the pass point.

Preferably the laser processing apparatus further comprises reference waveform graph display means for displaying a reference waveform graph representative of a waveform pattern of the reference waveform.

In the laser processing apparatus the reference waveform graph display means may acquire the reference waveform graph on the basis of times of a plurality of pass points which have been set by the pass point time setting means, and of a laser output ratio or an electrical parameter ratio of each point which has been set by the ratio setting means.

According to the laser processing apparatus of the present invention, appropriate reference values were set and entered for pulse laser beams or electrical parameters corresponding thereto, with setting entry, as ratios relative to those reference values, of the laser output values or the electrical parameter values in a plurality of waveform sections for constituting the laser output waveform or the electrical parameter waveform, whereby a reference waveform for waveform control can be obtained on the basis of those reference values and laser output ratios or the electrical parameter ratios of the waveform sections.

Furthermore, a waveform pattern of the set reference waveform was allowed to appear in the form of a waveform graph on the screen. By virtue of this, it is possible to set the reference waveform for waveform control as a diversity of waveform patterns through simple user operations and to easily and freely alter the once provided reference waveform for waveform control.

It is further possible to set the rise/fall sections of the laser output waveform or the electrical parameter waveform to arbitrary waveforms, so that the heating rate or cooling rate in the laser processing can be adjusted at will.

BRIEF DESCRIPTION OF THE DRAWINGS

The above and other objects, aspects, features and advantages of the present invention will become more apparent from the following description with reference to the accompanying drawings, in which:

FIG. 8 illustrates an example of a display on a "status" screen in accordance with the embodiment;

FIG. 9 illustrates an example of a display on a "power monitor" screen in accordance with the embodiment;

DESCRIPTION OF THE PREFERRED EMBODIMENTS

The present invention will now be described with reference to FIGS. 1 to 20 which illustrate preferred embodiments thereof.

Figure 1:
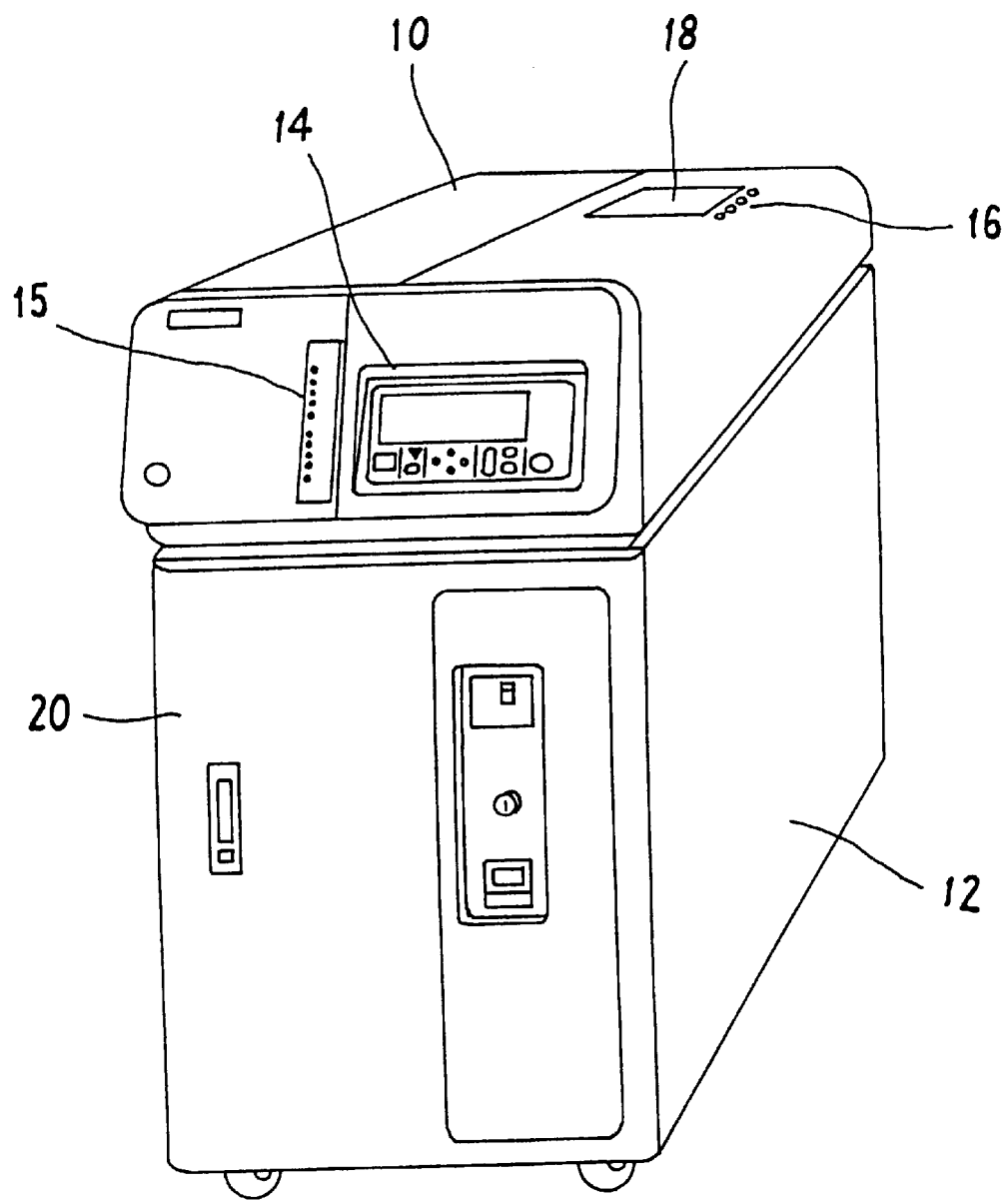
FIG. 1 is a perspective view showing the exterior of a laser processing apparatus in accordance with an embodiment of the present invention.
Figure 2:
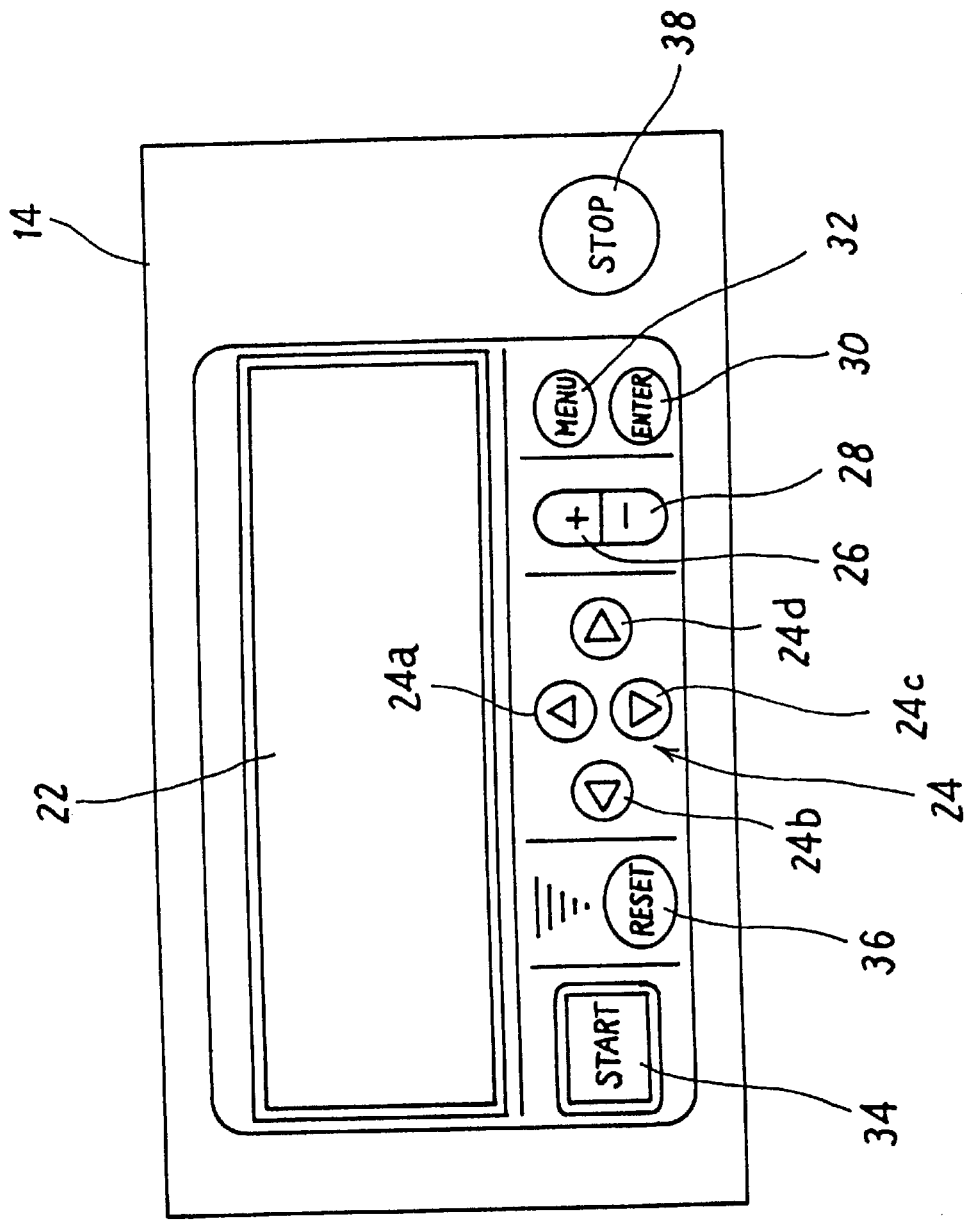
FIG. 2 is a partially enlarged top plan view showing the exterior of an operation panel of the laser processing apparatus in accordance with the embodiment in an enlarged scale.

FIGS. 1 and 2 illustrate an external configuration of a laser processing apparatus in accordance with an embodiment of the present invention. FIG. 1 is a perspective view of the entire apparatus and FIG. 2 is a partially enlarged front view of an operation panel of the apparatus.

Referring to FIG. 1 the laser processing apparatus comprises an upper housing 10 and a lower housing 12 which are integrally united. The upper housing 10 accommodates therein a laser oscillation unit, a control, a laser branching unit for multi-position processing, etc. On its front surface the upper housing 10 is provided for instance with an operation panel 14 including a display and various key switches and with a group of LEDs 15 for light-up display of the power supply status, high-voltage supply status, charge completion status, etc. On its top surface, the upper housing 10 is provided for instance with holes openings) 16 through which a plurality of optical fibers (not shown) for multi-position processing extend and with an openable/closable cover 18 for the fiber attachment work.

The lower housing 12 accommodates therein a power supply unit including a power part, an external connection terminal and a breaker, and a cooling unit including a tank, a pump, a heat exchanger, an ion exchange resin, a filter and an external piping connection terminal, etc. The lower housing 12 is provided with a front panel 20 in the form of a door.

Referring to FIG. 2 the operation panel 14 includes at its center a flat panel display, e.g., a liquid crystal display 22, under which are arranged various function keys 24 to 38 which in this embodiment are in the form of cursor keys 24 (24a to 24d), a plus (+) key 26, a minus (−) key 28, an enter key 30, a menu key 32, a start button 34, a reset button 36 and a stop button 38.

The cursor keys 24 (24a to 24d) are keys for moving a cursor in the vertical and horizontal direction on a screen so that the pressing of the keys 24a to 24d allow a movement of the cursor in the directions indicated by arrows of those keys.

The plus (+) key 26 and the minus (−) key 28 are data entry keys which are used, as described later, for the input of numerical values (decimal numbers) for a numerical item, selection of ON or OFF for an ON/OFF item, selection of FIX or FREE for a FIX/FREE item, etc.

The enter key 30 is a key for entering display data at the cursor position as established set data. The menu key 32 is a key for selecting a screen mode of the apparatus.

The start button 34 is a key for activating the apparatus to cause an emission of a pulse laser beam. The reset button 36 is used to cancel a "trouble" screen (not shown) appearing on the display 22 upon the occurrence of trouble. The stop button 38 is a button which is operated upon emergency. When this button is pressed, the high voltage is shut off, so that the cooling unit comes to a stop.

Figure 3:
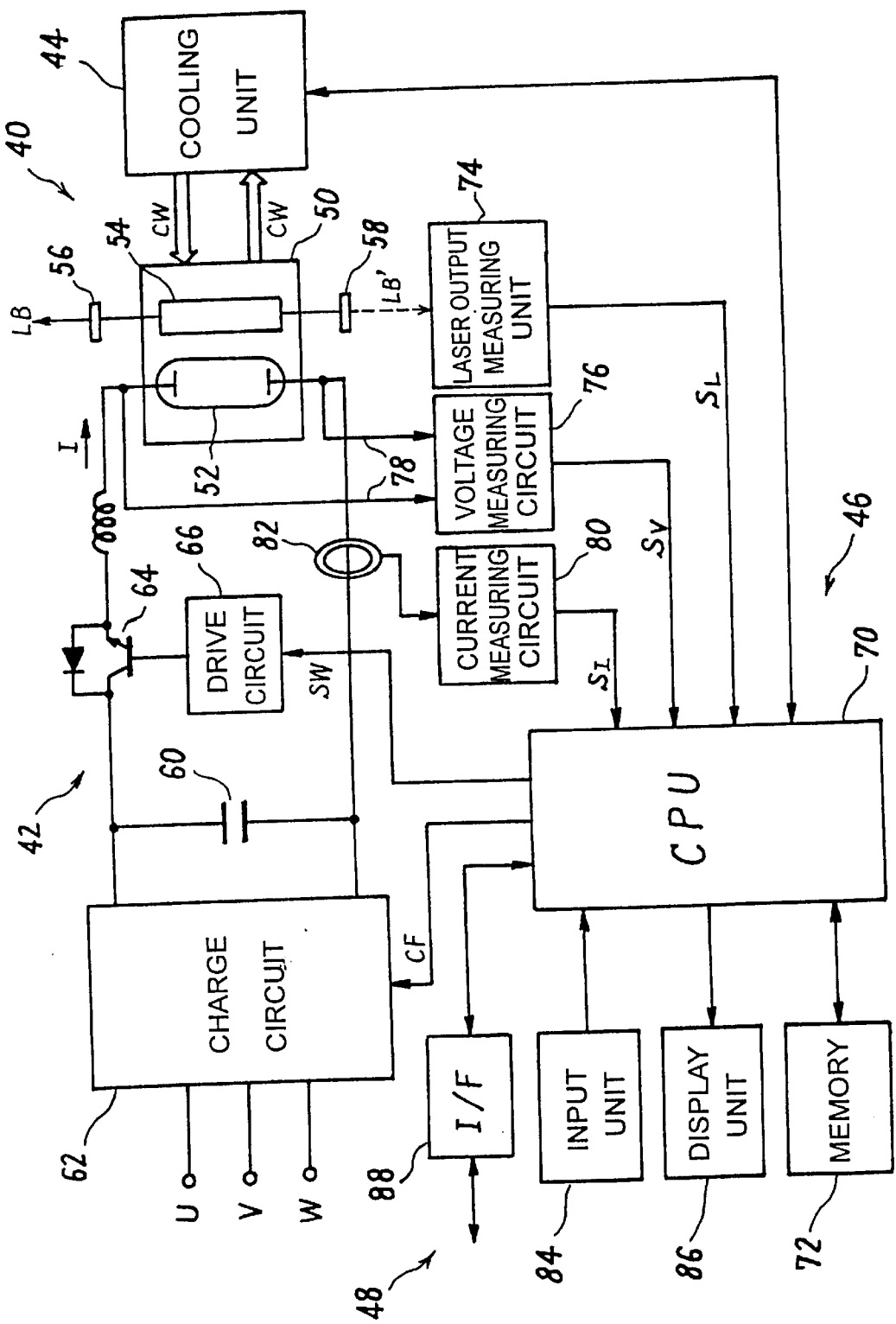
FIG. 3 is a block diagram showing a configuration of the laser processing apparatus in accordance with the embodiment.

FIG. 3 is a block diagram showing a configuration of the laser processing apparatus. The laser processing apparatus of the present invention comprises a laser oscillation unit 40, a laser power supply unit 42, a laser cooling unit 44, a control 46 and an input/output interface unit 48.

The laser oscillation unit 40 includes an excitation lamp 52 as a light source for excitation and a YAG rod 54 as a laser medium, both of which are arranged within a chamber 50, and a pair of optical resonator mirrors 56 and 58 which are disposed on an optical axis of the YAG rod 54 outside the chamber 50.

When the excitation lamp 52 is lit, its optical energy excites the YAG rod 54, allowing a light to be emitted from the opposite ends of the YAG rod 54 along the optical axis to be reiteratively reflected between the optical resonators 56 and 58 for amplification and to pass as a pulse laser beam LB through the output mirror 56. After passing through the output mirror 56, the pulse laser beam LB is delivered to the laser branching unit (not shown) in which it is split into a plurality of branch pulse laser beams. The branch pulse laser beams are then fed via associated optical fibers (not shown) to associated emission units (not shown) at processing sites so that they are irradiated from the associated emission units onto a workpiece.

The laser power supply unit 42 includes a capacitor 60 for storing electric power for laser oscillation to be supplied to the laser oscillation unit 40, a charge circuit 62 for charging the capacitor 60 up to a predetermined DC voltage through the DC conversion of a commercial AC, e.g., three-phase AC power supply voltage (U, V, W), a transistor 64 serving as a switching element which is connected between the capacitor 60 and the excitation lamp 52 of the laser oscillation unit 40, and a drive circuit 66 for switching the transistor 64 at a high frequency (e.g., 10 kHz).

The laser cooling unit 44 serves to radiate heat generated by the excitation lamp 52 and the YAG rod 54 of the laser oscillation unit 40 to the outside of the laser oscillation unit 40. The laser cooling unit 44 is configured to supply to the laser oscillation unit 40 a cooling medium, e.g., cooling water CW of which temperature has been controlled to a predetermined temperature.

The control 46 includes a CPU (microprocessor) 70 for providing a control of the action of the entire apparatus or of each unit, a memory 72 for holding various programs under which the CPU 70 performs predetermined processing, various set values or computed data, and various measuring means 74, 76, 78, 80 and 82 for measuring the laser output of the pulse laser beam LB or electric parameters corresponding thereto of the laser power supply unit 42.

Among these measuring means a laser output measuring unit 74 is provided with a photo sensor for receiving a laser beam LB' leaking behind the optical resonator mirror 58 and with a measuring circuit for finding the laser output of the pulse laser beam LB on the basis of an electric signal output from the photo sensor, the acquired laser output measurement value $S_L$ being fed to the CPU 70.

A voltage measuring circuit 76 is electrically connected via voltage sense lines 78 to both terminals of the excitation lamp 52 to measure as e.g., an effective value the voltage (lamp voltage) applied by the power supply unit 42 to the excitation lamp 52, the acquired lamp voltage measurement value $S_V$ being fed to the CPU 70. A current measuring circuit 80 receives a current detection signal from a current sensor in the form of a Hall CT 82 for instance which is attached to a lamp current supply circuit of the power supply unit 42, to measure as an effective value the current (lamp current) I supplied to the excitation lamp 52, the acquired lamp current measurement value $S_I$ being fed to the CPU 70.

For the power supply unit 42 the CPU 70 imparts a charge control signal CF for charging the capacitor 60 up to a set voltage to the charge circuit 62 and imparts a switching control signal SW for waveform control to the drive circuit 66.

In the waveform control of this embodiment the CPU 70 finds a comparison error by comparing to a previously defined reference waveform for waveform control, a laser output measurement value $S_L$ from the laser output measuring unit 74, a lamp voltage measurement value $S_V$ from the voltage measuring circuit 76, a lamp current measurement value $S_I$ from the current measuring circuit 80, or a lamp power measurement value $S_P$ ($S_{V \cdot SI}$) obtained from the lamp voltage measurement value $S_V$ and the lamp current measurement value $S_I$. The CPU 70 then generates a switching control signal SW in the form of a pulse width control signal, for example, so as to nullify the comparison error.

Such a feedback control system provides control, allowing the laser output of the pulse laser beam LB oscillation output from the laser oscillation unit 40 or the electric parameters (lamp current, lamp power, lamp voltage) corresponding thereto of the laser power supply unit 42 to conform to the reference waveform for each waveform control.

The input/output interface unit 48 includes an input unit 84, a display unit 86 and a communication interface (I/F) circuit 88. The input unit 84 is provided in the form of the group of key switches on the operation panel 14, and the display unit 86 is provided in the form of the group of LEDs 15 and the display 22 on the front surface of the apparatus.

The I/F circuit 88 is used for data communication with the external apparatuses or units.

It is also possible to provide the operation panel 14 in the form of a unit (program unit) separable from the apparatus body. In this event the program unit is provided with the CPU 70, the memory 72, the input unit 84 and the display unit 86 and is electrically connected via a communication cable to the apparatus body.

Figure 4:
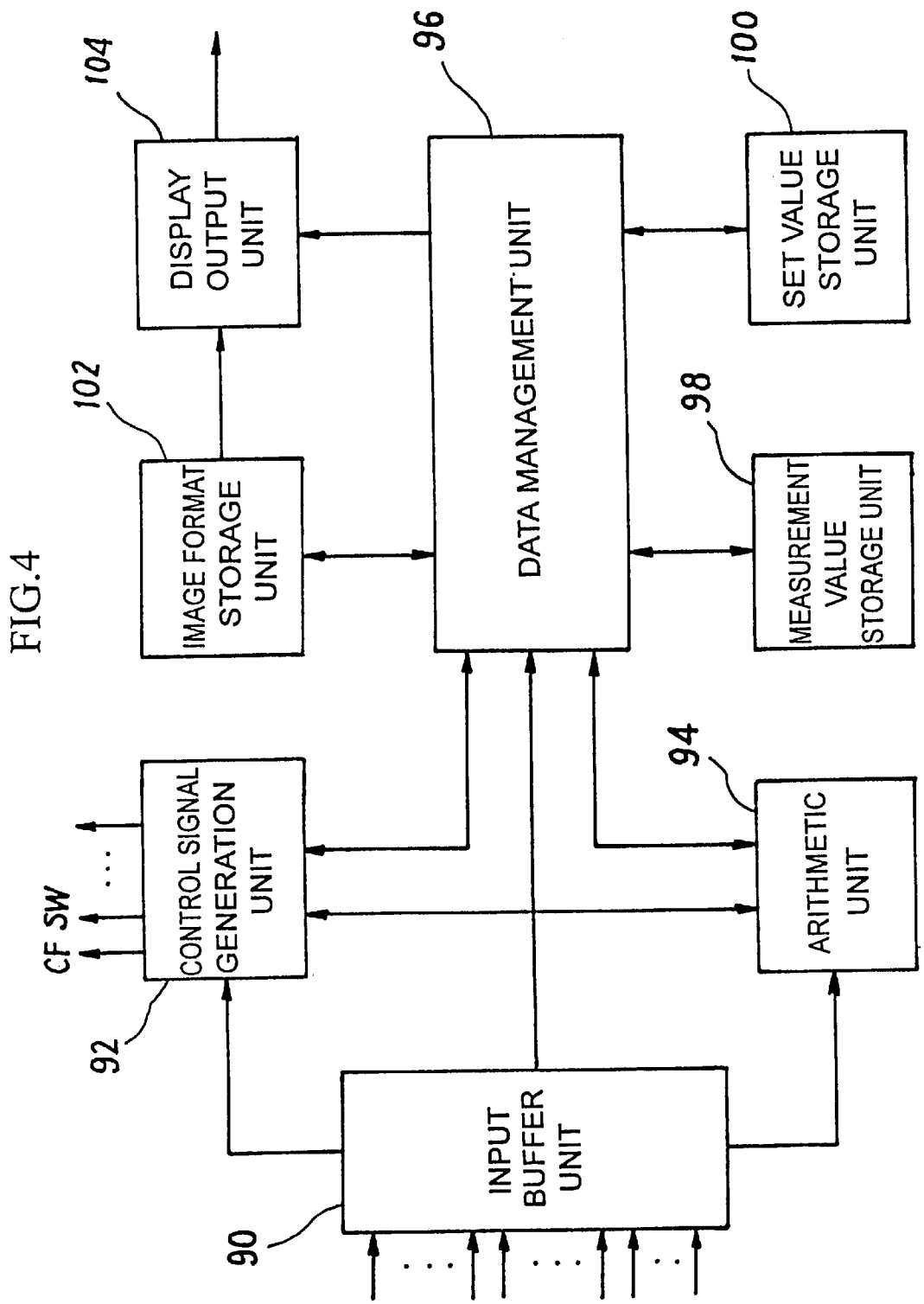
FIG. 4 is a block diagram showing a configuration of function means implemented by a CPU and a memory of the laser processing apparatus in accordance with the embodiment.

FIG. 4 is a block diagram showing a configuration of functional means implemented by the CPU 70 and the memory 72 in this embodiment. As shown the CPU 70 and the memory 72 implement an input buffer unit 90, a control signal generation unit 92, an arithmetic unit 94, a data management unit 96, a measurement value storage unit 98, a set value storage unit 100, an image format storage unit 102 and a display output unit 104.

The input buffer unit 90 fetches and temporarily holds data to be input to the CPU 70, for example, set data from the input unit 84, external data from the communication interface circuit 88, measurement value data from the cooling unit 44 or the measuring circuits 74, 76 and 80.

The arithmetic unit 94 executes all arithmetic processes required for the CPU 70. The control signal generation unit 92 generates all control signals from the CPU 70 for transmission to the exterior. The data management unit 96 manages all data saves and moves within the CPU 70 and memory 72.

The measurement value storage unit 98 holds measurement value data input to the CPU 70 whereas the set value storage unit 100 holds set value data input to the CPU 70 or set value data obtained through arithmetic within the CPU 70.

The image format storage unit 102 stores image data representative of formatted images of which content of display remains fixed among various pictures appearing on the display 22. The display output unit 104 superposes images representative of variables such as set values from the data management unit 96 on the formatted images given by the image format storage unit 102 to form a combined screen and provides image data of that combined screen as its output to the display unit 86.

Reference is now made to FIGS. 5 to 20 to describe functions for setting a reference waveform for waveform control in the laser processing apparatus of this embodiment.

Figure 5:
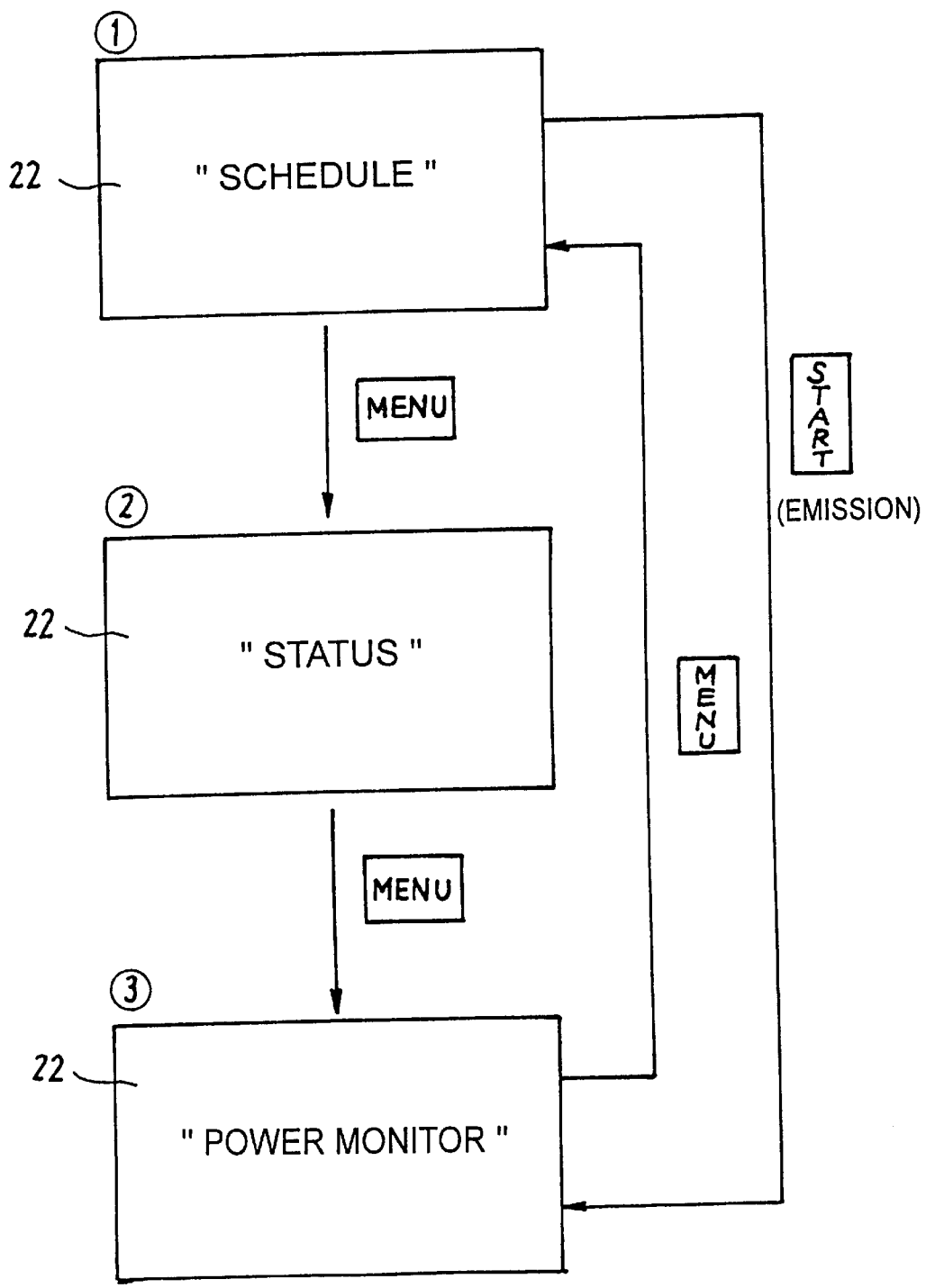
FIG. 5 illustrates a relationship between major screens displayed by the apparatus of the embodiment and mutual switching there among.

FIG. 5 illustrates a relationship between major screens appearing on the display 22 in this embodiment and mutual switching of the screens.

Three major screens of this embodiment are a "schedule" screen ①on which the user enters desired set values into various setting items, a "status" screen ②on which intra-apparatus major status information is displayed, and a "power monitor" screen ③on which there appears a laser output measurement value of the most recently emitted pulse laser beam LB. The "schedule" screen ①is a particularly important one among them.

The three screens ①, ②and ③are mutually switchable through the operation of the menu key 32. More specifically, when pressing the menu key 32 while the "schedule" screen ①is being displayed, a switch is made to the "status" screen ②. When pressing the menu key 32 while the "status" screen ②is being displayed, a switch is made to the "power monitor" screen ③. When pressing the menu key 32 while the "power monitor" screen ③is being displayed, a switch is made to the "schedule" screen ①.

Furthermore, when the start button 34 is pressed while the "schedule" screen ①is being displayed, a pulse laser beam LB is emitted, immediately after which a switch is made to the "power monitor" screen ③.

Figure 6:
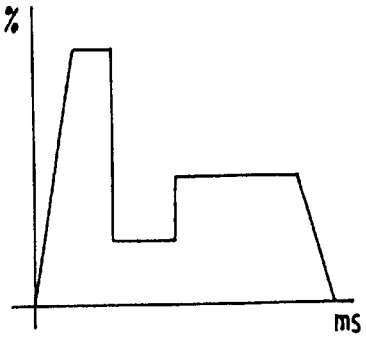
FIG. 6 illustrates an example of a display on a "schedule" screen in FIX mode in accordance with the embodiment.
Figure 7:
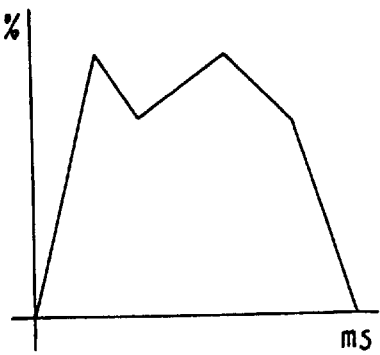
FIG. 7 illustrates an example of a display on a "schedule" screen in FREE mode in accordance with the embodiment.

FIGS. 6 and 7 illustrate by way of example the content of the display of the "schedule" screen. The "schedule" screen of this embodiment has two setting screen modes, that is, a FIX mode (FIG. 6) and a FREE mode (FIG. 7).

When specifying FIX at a screen mode selection item FORM in the topmost line of the screen through the key entry operation which will be described later, a FIX mode screen appears as shown in FIG. 6, whereas when selecting FREE, a FREE mode screen appears as shown in FIG. 7. The functions and actions of this apparatus about the "schedule" screen will be described later in greater detail.

FIG. 8 illustrates by way of example the content of the display of the "status" screen. The "status" screen displays shutter on/off statuses for a plurality of, e.g., six branch pulse laser beams (BEAM 1 to BEAM 6) for multi-position processing, feedback parameters (LASER POWER/LAW POWER/LAMP CURRENT) being currently selected in the laser output waveform control, and other major status information.

FIG. 9 illustrates by way of example the content of the display of the "power monitor" screen. The "power monitor" screen displays measurement values, etc., of the energy (J) and average power (W) of the most recently emitted pulse laser beam LB.

Normally, in response to a single pressing operation of the start button 34, pulse laser beams LB of the number which has previously been set in the schedule mode are repeatedly emitted at a certain cycle.

An energy measurement value ENERGY displayed on the "power monitor" screen is a measurement value of a single typical pulse there among, e.g., of the most recent pulse. An average output measurement value AVERAGE is a value obtained by multiplying the energy measurement value per pulse, ENERGY, by a cycle count, i.e., the number of pulse repetitions per unit time, (REPEAT).

In the case of the "power monitor" screen, when a designation is made of ON at a waveform selection item MW in the topmost line on the screen, there appears a waveform diagram representative of a laser output waveform of a currently emitted pulse laser beam LB in the right half region on the screen as shown in FIG. 9. This waveform diagram is acquired through desired data processing by the arithmetic unit 94 in the CPU 70 on the basis of the laser output measurement value $S_L$ from the laser output measuring unit 74, the waveform diagram being stored in the measurement value storage unit 98.

When OFF is designated at the waveform selection item MW, there appears, although not shown, a waveform diagram representative of a reference waveform which has been set on the "schedule" screen in the right half region on the screen.

Reference is now made to FIGS. 6, 7 and 10 to 20 to describe functions and actions of the present apparatus about the "schedule" screen.

Figure 10:
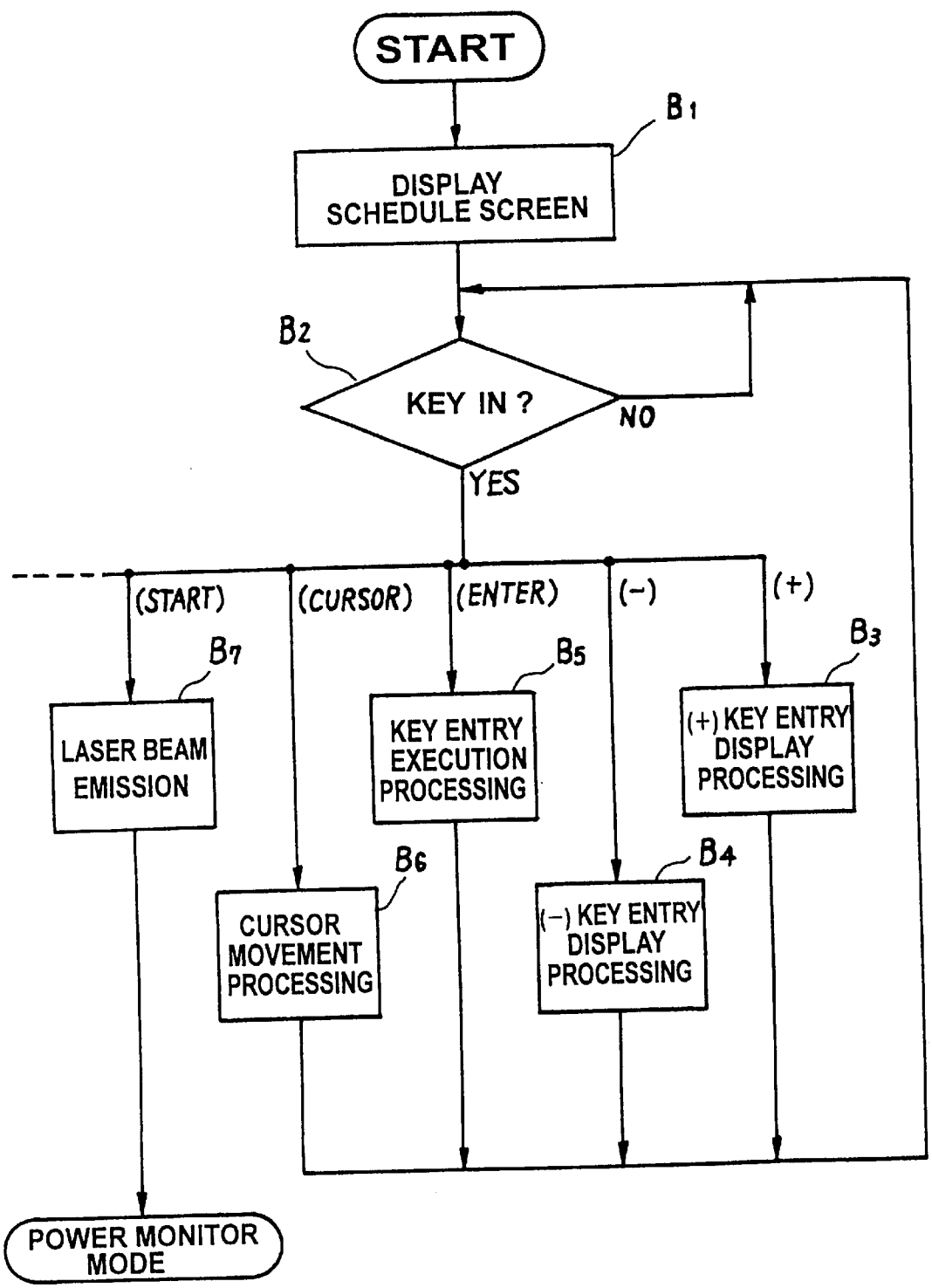
FIG. 10 illustrates a main processing procedure effected by the CPU in a schedule mode of the embodiment.
Figure 11:
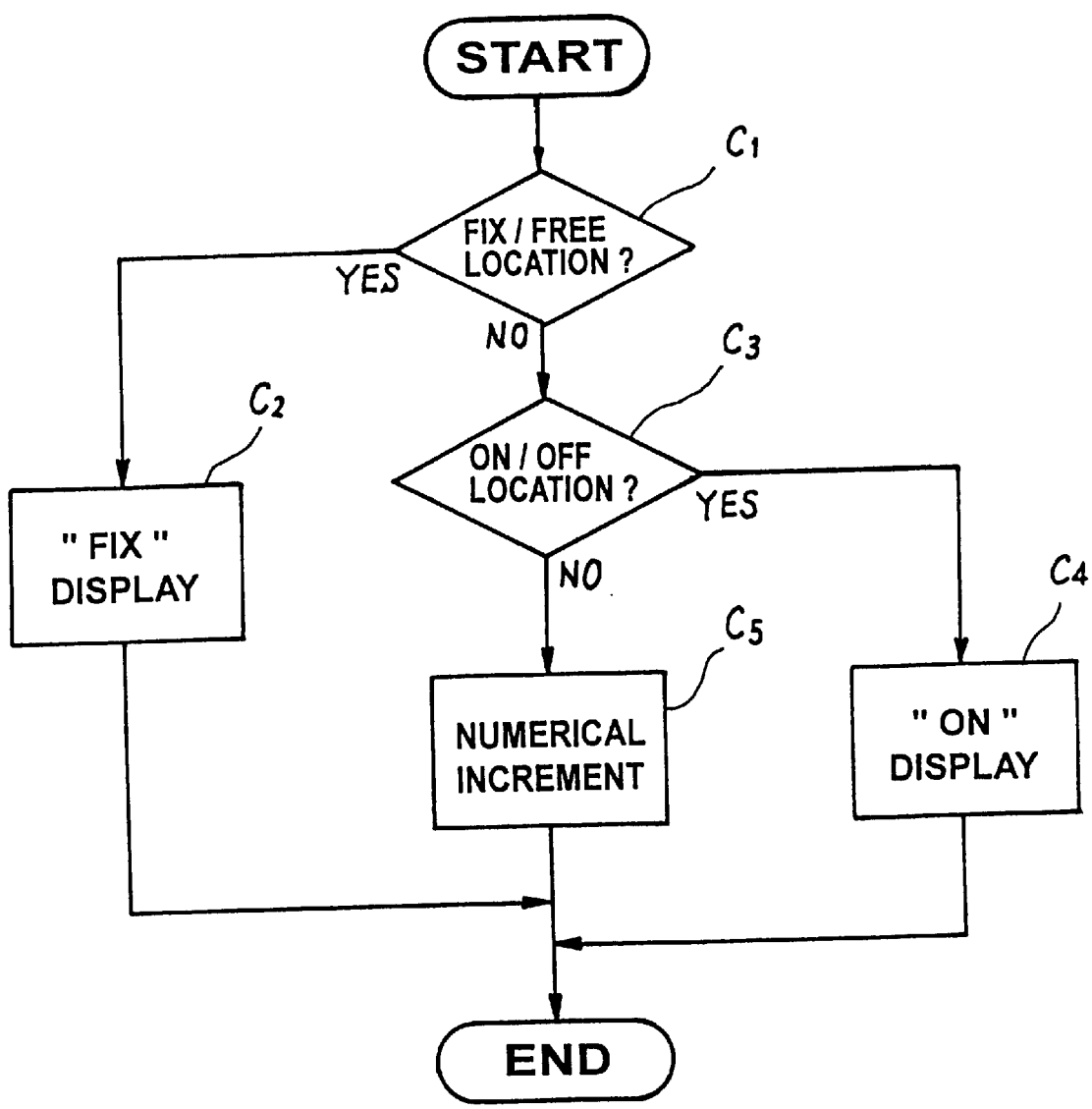
FIG. 11 illustrates a procedure of plus (+) key entry display processing in the schedule mode of the embodiment.
Figure 12:
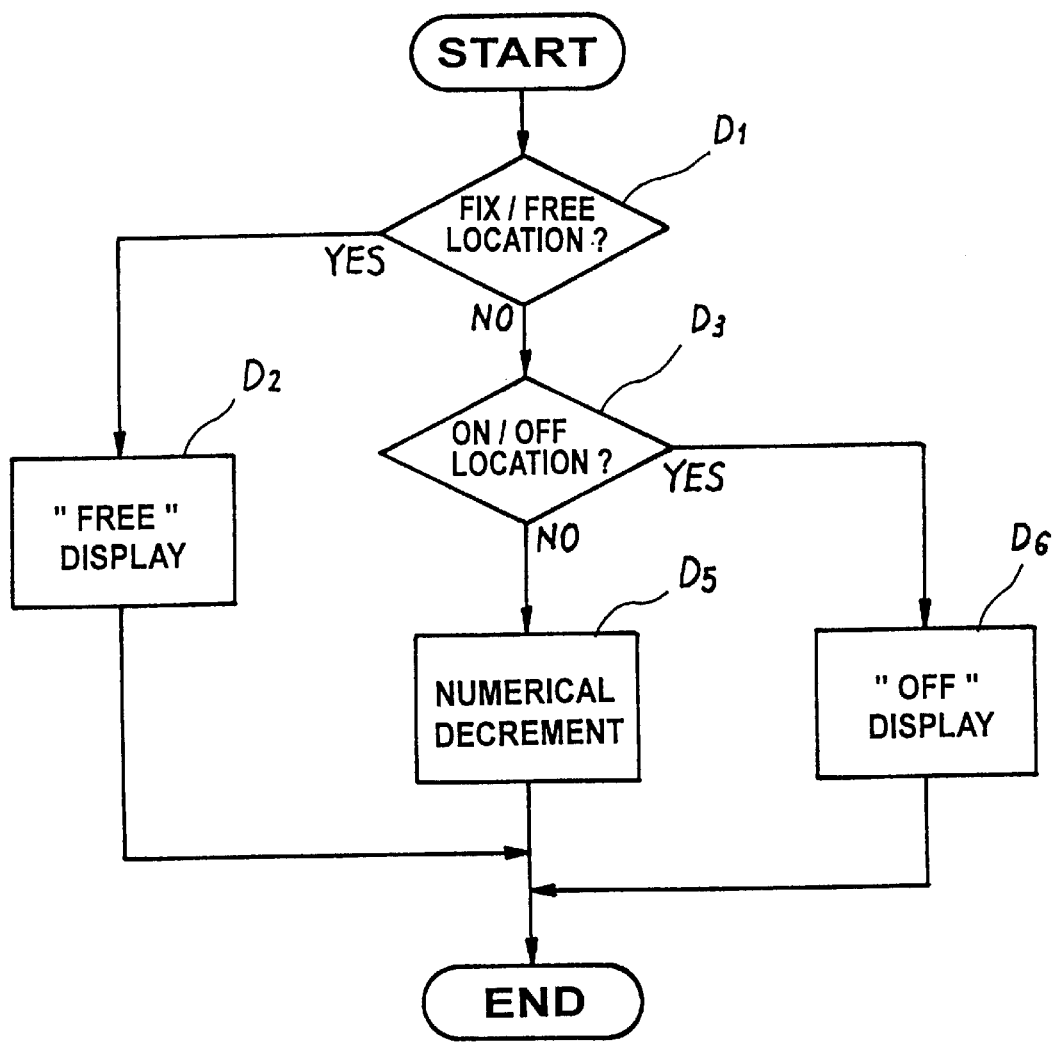
FIG. 12 illustrates a procedure of minus (−) key entry display processing in the schedule mode of the embodiment.
Figure 13:
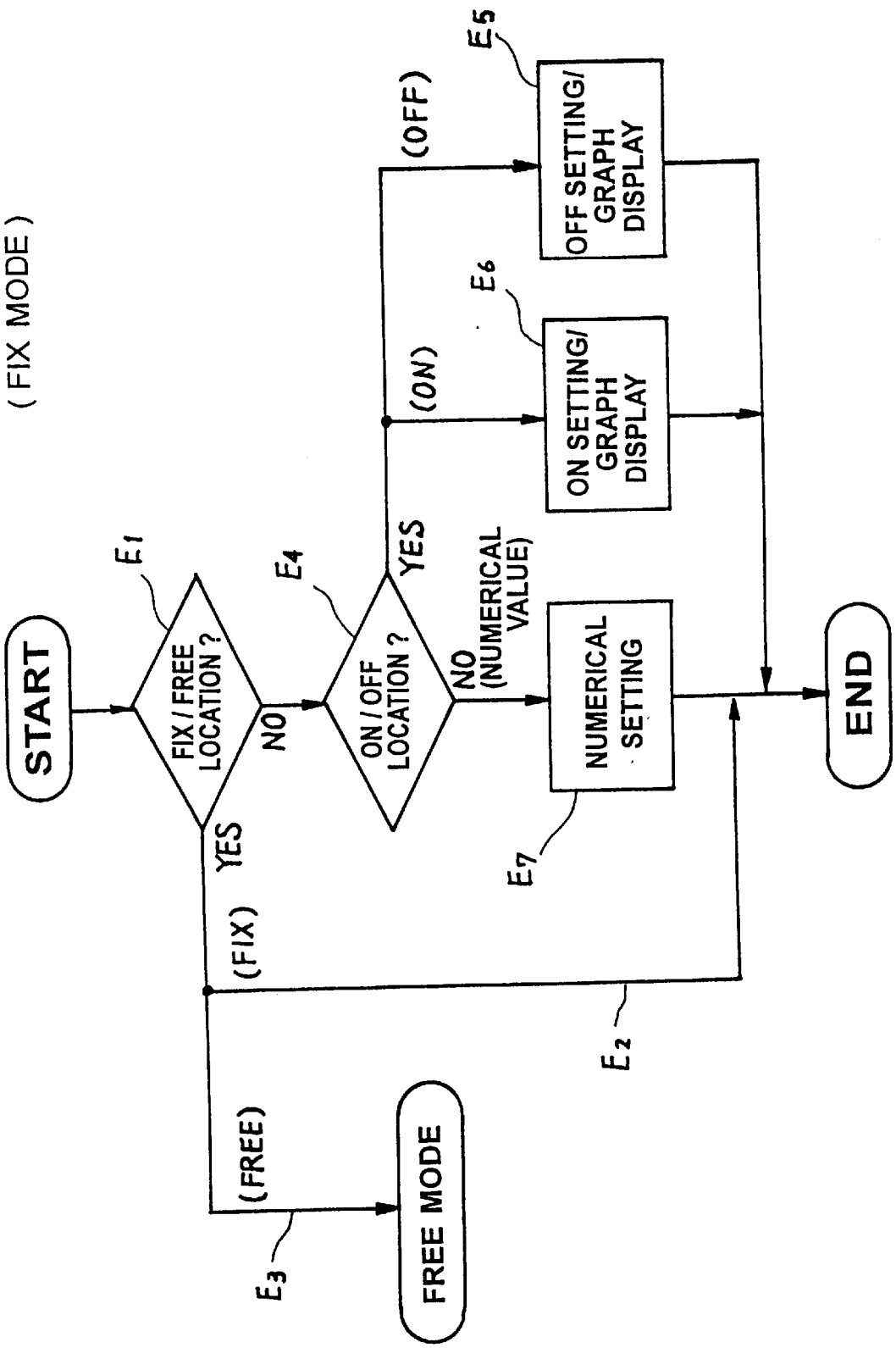
FIG. 13 illustrates a procedure of key entry execution processing in the schedule mode (FIX mode) of the embodiment.

FIG. 10 illustrates main processing procedures effected by the CPU 70 in the "schedule" screen mode. FIGS. 11, 12 and 13 illustrate (+) key entry processing, (−) key entry processing and key entry execution processing (FIX mode), respectively, of the main processing.

Figures 14, 15:
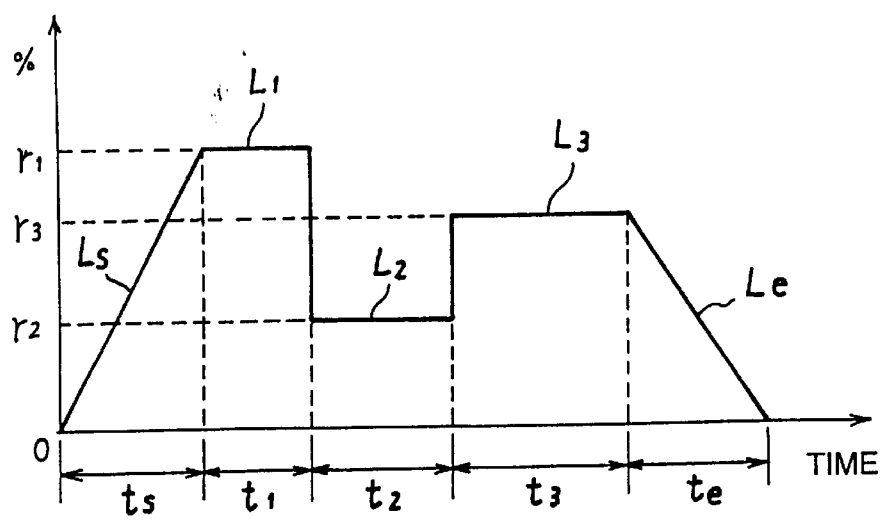
FIG. 14 diagrammatically illustrates an example of storage locations of set value data in the FIX mode of the embodiment.
FIG. 15 illustrates an example of a waveform format of a reference waveform in the FIX mode of the embodiment.
Figure 16A:
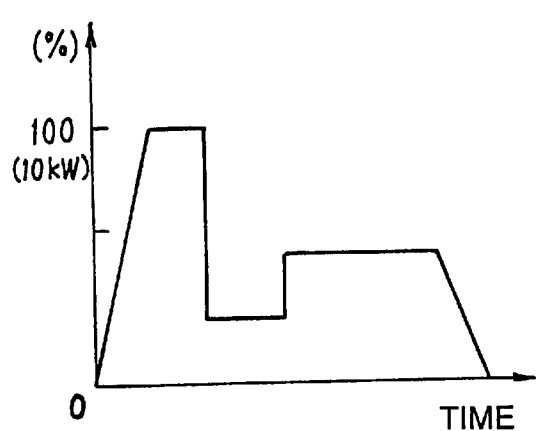
FIGS. 16A and 16B illustrate relationships between a waveform diagram of the reference waveform displayed on the "schedule" screen in the FIX mode of the embodiment and a laser output reference value.
Figure 16B:
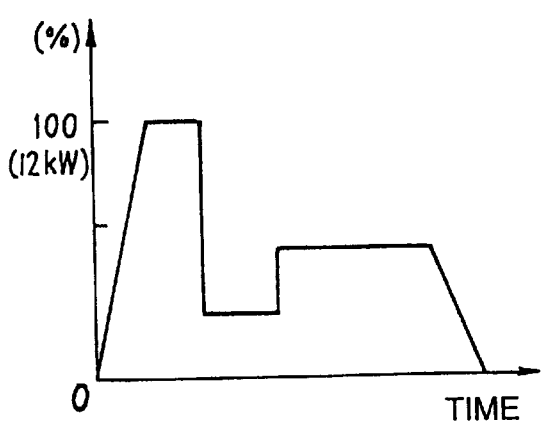
Figure 17A:
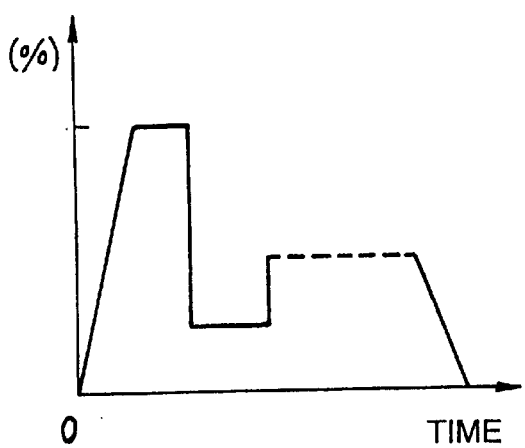
FIGS. 17A and 17B illustrate waveform diagram display functions upon the setting of the reference waveform in accordance with the embodiment.
Figure 17B:
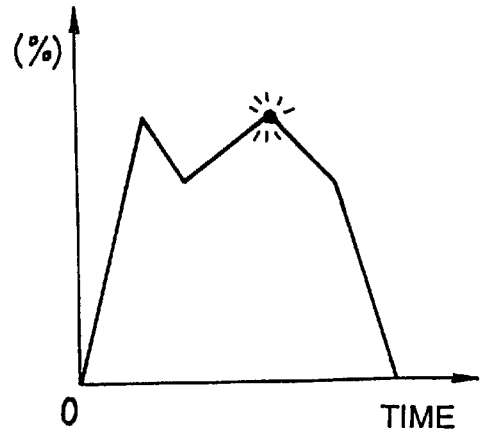
Figure 19:
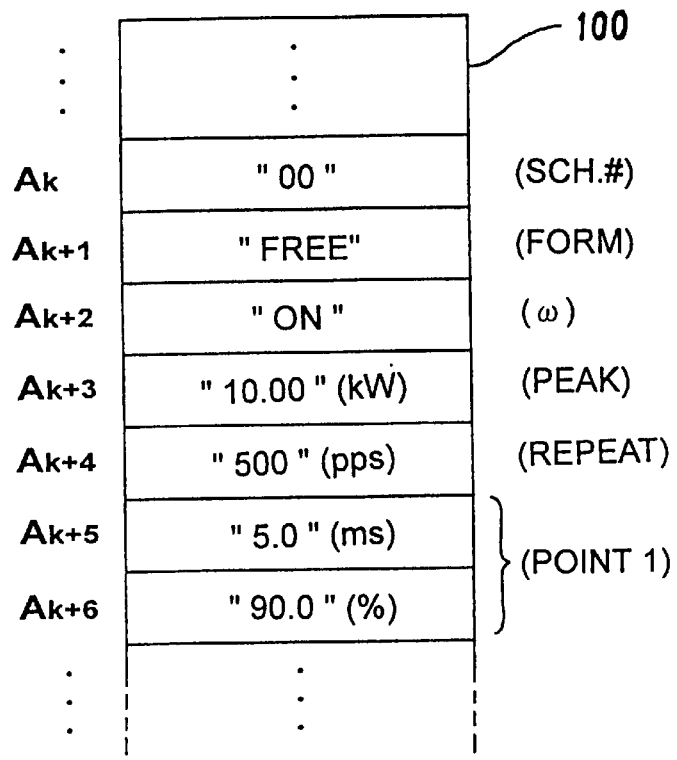
FIG. 19 diagrammatically illustrates an example of storage locations of set value data in the FREE mode of the embodiment.
Figure 20:
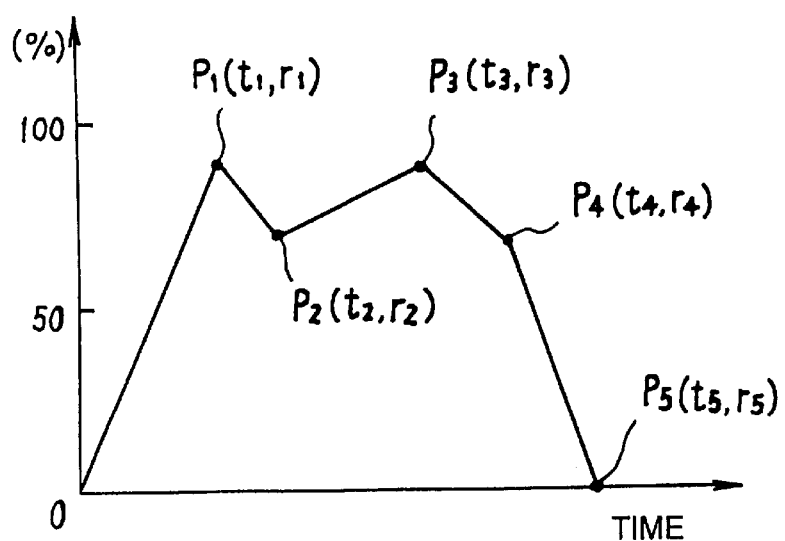
FIG. 20 illustrates an example of the waveform format of the reference waveform in the FREE mode of the embodiment.
Figures 21, 22:
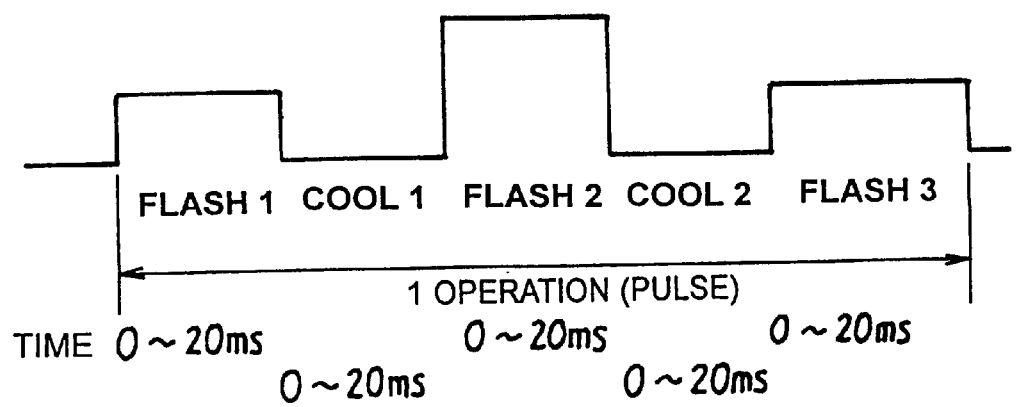
FIG. 21 illustrates an example of a setting mode screen used in a conventional laser processing apparatus.
FIG. 22 illustrates a waveform format of a reference waveform for waveform control used in the conventional laser processing apparatus.
Figure 23A:
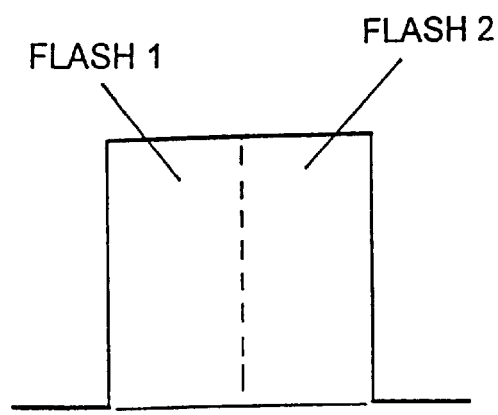
FIGS. 23A to 23D illustrate examples of the waveform pattern of the reference waveform which can be set in the conventional laser processing apparatus.
Figure 23B:
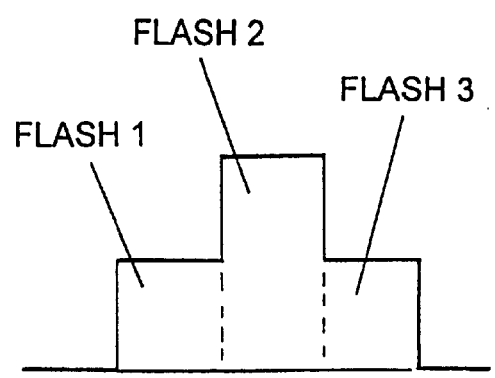
Figure 23C:
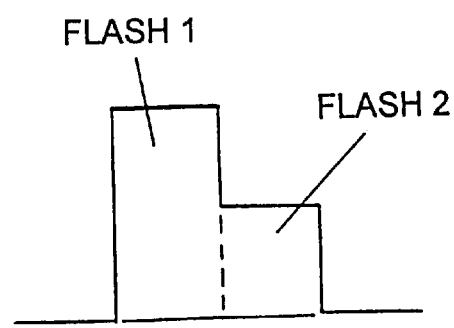
Figure 23D:
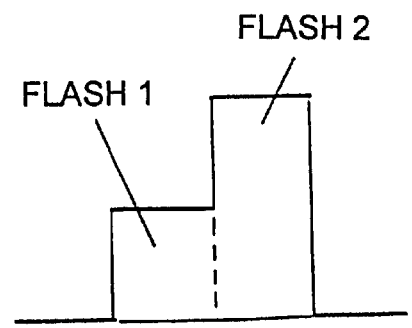

FIG. 14 diagrammatically shows an example of set value data storage locations in the FIX mode of this embodiment, and FIG. 15 illustrates an example of a waveform format of the reference waveform in the FIX mode. FIGS. 16A and 16B show relationships between the waveform diagram of the reference waveform appearing on the FIX mode screen and the laser output reference value. FIGS. 17A and 17B show waveform diagram display functions upon the setting of the reference waveform in this embodiment. FIGS. 18A to 18F illustrate by way of example waveform patterns of the reference waveforms capable of being set in the FIX mode. FIG. 19 diagrammatically shows an example of set value data storage locations in the FREE mode of this embodiment, and FIG. 20 shows an example of a waveform format of the reference waveform in the FREE mode.

As set forth hereinabove, when the menu key 32 is pressed on the "power monitor" screen, the CPU enters the schedule mode as shown in FIG. 10.

When entering the schedule mode, the CPU first displays on the display 22 a "schedule" screen which was displayed immediately before the completion of the most recent schedule mode (step B1). Accordingly there appears either the "schedule" screen in the FIX mode as shown in FIG. 6 or the "schedule" screen in the FREE mode as shown in FIG. 7.

On the thus displayed "schedule" screen, it is possible for the user to perform desired set value entries or action instructions on the apparatus by key entries through the group of keys and buttons 24 to 38 on the operation panel 14 (step B2).

It is to be noted in FIGS. 6 and 7 that to facilitate illustration, items allowing setting entries are enclosed by dotted lines on the setting mode screen. These dotted lines are invisible on the actual screen. In FIGS. 6 to 9 numerical values indicated by hollow or bold numerals are various measurement values and are not to be set or altered by key entries.

For example, if it is desired to switch the screen from the FREE mode "schedule" screen (FIG. 7) to the FIX mode "schedule" screen (FIG. 6), the cursor is moved to a data entry position at the screen mode selection item FORM in the first line on the screen and then the plus (+) key 26 is pressed.

Then the apparatus executes plus (+) key entry display processing (step B3). In this processing (FIG. 11) it is judged that the cursor lies at a FIX/FREE position so that the cursor position display is changed from FREE to FIX (step C2). Furthermore, data indicating that the cursor is at the FIX position are also temporarily held.

Then when the user presses the enter key 30, the apparatus executes the key entry execution processing (step B5) so that the display screen is switched from the FREE mode "schedule" screen (FIG. 7) to the FIX mode "schedule" screen (FIG. 6) (reverse switching processing to that in the step E3 of FIG. 13). Then as shown in FIG. 14, data or flags indicating that the currently set screen mode is the FIX mode are stored in a predetermined storage address A2 provided in a predetermined area within the set value storage unit 100 (FIG. 14).

Furthermore, in case the user desires that the label or schedule No. for managing a group of set values for one screen is set to "03", the cursor key 24 is moved to a data entry position at schedule No. setting item SCH. # in the first line on the screen so that the schedule No. is set to the desired value "03" through the operation of the plus (+) key 26 or the minus (−) key 28.

The apparatus executes plus (+) key entry display processing every time the plus (+) key 26 is pressed (step B3) and executes minus (−) key entry display processing every time the minus (−) key 28 is pressed (step B4). Since the cursor is at the numerical value entry position, the numerical value at the cursor position is decremented or incremented one by one for update through those key entry display processings so that the updated numerical value is displayed on the screen, with the numerical data being held in an appropriate storage area or a register (steps C5 and D5)

The user can press the enter key 30 at the time when the schedule No. display has reached "03" as described above. In response to this key entry, the CPU 70 executes the key entry execution processing (step B5). In this case the schedule No. is definitely determined to be "03" (step E7) so that the set value "03" data are stored in a predetermined storage address A1 within the set value storage unit 100 (FIG. 14).

For the setting entry of the reference waveform for waveform control, in the case of the FIX mode, desired numerical data are set and entered into items of a laser output reference value PEAK and waveform elements ↑ SLOPE, FLASH1, FLASH2, FLASH3 and ↓ SLOPE.

Any laser output values can be set and entered in unit of kW into the laser output reference value PEAK among these items. It is to be appreciated that selection may ordinarily be made of values (e.g., 10, 20, 50, 100, 1000, etc.) suitable for the ratio calculation reference in the vicinity of the laser output maximum value which is to be imparted to the pulse laser beam LB to be emitted at that schedule No.

Furthermore, only the time is set and entered into the rise period ↑ SLOPE and the fall period ↓ SLOPE. Into the flash periods FLASH1, FLASH2 and FLASH3 are set and entered the laser output value for each period in the form of a value of ratio relative to the laser output reference value PEAK as well as the time of each period.

Although the time of each period and the laser output ratio can be set to any arbitrary values, certain limitations may be provided as long as they can be set in view of the actual application. For example, the time duration of the entire waveform (pulse width) can be 0.05 (ms) to 30.0 (ms) and the ratios can be 0(%) to 200(%).

Numerical values are entered into the items for the setting of the reference waveform. The user moves the cursor to a data entry position for each item, acts on the plus (+) key 26 or the minus (−) key 28 to set a desired value and presses the enter key 30. In response to those key operations, the CPU 70 executes the numerical value entry display and setting processing similar to those for the above schedule No. setting item SCH. # and stores the thus entered set value data into predetermined storage addresses within the set value storage unit 100 (FIG. 14).

In the setting example shown in FIG. 6 the laser output reference value PEAK is set to 10.0 (kW) and the laser output ratio of the flash periods FLASH1, FLASH2 and FLASH3 are set to 100.0(%), 25.0(%) and 50.0(%), respectively. This means that the laser output values (kW) of the flash periods FLASH1, FLASH2 and FLASH3 are set to 10.0 (kW), 2.5 (kW) and 5.0 (kW), respectively, in the kW conversion values.

During the numerical value setting processing for the waveform element items as described above (step E7), the CPU 70 creates a reference waveform for waveform control and a reference waveform graph for display.

As can be seen in FIG. 15 the reference waveform in the FIX mode consists of an upslope waveform section $L_s$ corresponding to the rise period ↑ SLOPE, first, second and third flat waveform sections $L_1$, $L_2$ and $L_3$ corresponding respectively to the first flash period FLASH1, the second flash period FLASH2 and the third flash period FLASH3, and a downslope waveform section Le corresponding to the fall period ↓ SLOPE.

First with respect to the reference waveform graph for display, the upslope waveform section $L_s$ and the first flat waveform section $L_1$ are simultaneously obtained from time $t_s$ of the rise period ↑ SLOPE, time $t_1$ of the first flash period FLASH1 and the laser output ratio $r_1$. Afterward, in such a manner that the subsequent waveform sections connect to the preceding waveform sections, the second flat waveform section $L_2$ is derived from time $t_2$ of the second flash period FLASH2 and the laser output ratio $r_2$, the third flat waveform section $L_3$ is derived from time $t_3$ of the third flash period FLASH3 and the laser output ratio $r_3$, and the downslope waveform section $L_e$ is derived from time $t_e$ of the fall period ↓ SLOPE.

The thus obtained reference waveform graph data are stored in a predetermined storage area within the set value storage unit 100.

The original reference waveform for waveform control is obtained by multiplying (conversion) laser output ratios (r) of the thus created reference waveform graph sections by the laser output reference value PEAK.

The reference waveform data representative of the reference waveform for waveform control are also stored in a predetermined storage area within the set value storage unit 100. Then when the pulse laser beam LB is emitted, the CPU 70 uses the reference waveform data for waveform control as a reference value for feedback waveform control in the function of the control signal generation unit 92 or the arithmetic unit 94.

It is possible in the FIX mode as shown in FIG. 6 to display a waveform pattern of the set and entered reference waveform in the form of a reference waveform graph on the screen. When desiring to see the reference waveform graph, the user moves the cursor to a data entry position for a graph ON/OFF selection item indicated by a graphic symbol in the second line on the screen and presses the plus (+) key 26.

In response to this key operation, the CPU 70 executes the plus (+) key entry display processing (step B3) and sets the cursor position display to ON (step C4). Then when the user presses the enter key 30, the CPU 70 executes the plus (+) key entry display processing (step B5) and, in addition to the execution of ON setting, displays the reference waveform graph in a predetermined area on the screen (right half region on the screen) (step E6, graph ON screen of FIG. 16).

Accordingly as the set values are entered into the waveform element items in the order of FLASH1, FLASH2, . . . , starting from ↑ SLOPE as described hereinabove, the waveform sections $L_s$, $L_1$, $L_2$, . . . of the reference waveform are obtained in sequence. Then the reference waveform graph is displayed in the process of creation on the screen.

This allows the user to create his/her own objective waveform pattern in a brief period of time while verifying by the waveform graph on the screen the state of process of the formation of the reference waveform in accordance with the sequential entry of the set values into the waveform element items. It would also be easy to alter the waveform sections L of the once finished reference waveform at will.

In the case of alteration of the waveform sections L, the user moves the cursor to the data positions for the associated waveform element items. At that time, by means of the image format storage unit 102 and the display output unit 104, the CPU 70 can distinguishably display the waveform section L of the reference waveform graph corresponding to the associated waveform element item at which the cursor is positioned, by a dotted line display (or by a specific color display) as shown in FIG. 17A.

When desiring to clear the reference waveform graph from the screen, the user sets the cursor to the data entry position for the graph ON/OFF selection item to press the minus (−) key 26 (OFF appears) and then presses the enter key 30.

In case the reference waveform graph is not displayed, there appears instead in the right half region on the screen a set item column for the repeat count (cycle) per unit time, REPEAT, the total number of the pulse laser beams LB emitted by a single starting operation, SHOT, the laser energy monitor values (upper and lower limits) per pulse, HIGH and LOW, for the judgment of non-defectives or defectives (graph OFF screen of FIG. 6).

Into the items for such emission condition and monitor condition there can be entered desired set values (numerical values) by use of the cursor key 24, the plus (+) key 26, the minus (−) key 28 and the enter key 30, etc., as well.

In the bottom most line on the screen there are always displayed ON/OFF selection items for a high voltage HV, a main (optical resonator) shutter MAIN SHUTTER and a guide beam POSITION. With respect to these selection items as well, the ON/OFF setting can be made by the same key operation as that for the above graph ON/OFF selection item indicated by a graphic symbol.

As described above, the reference waveform set in the FIX mode of this embodiment consists of the upslope waveform section $L_s$, the plurality of, e.g., three flat waveform sections $L_1$, $L_2$ and $L_3$, and the downslope waveform section $L_e$.

The waveform upon the rise, i.e., the upslope waveform section $L_s$ among them can be adjustable to desired angle of inclination and rise time by selecting appropriate values as the set values of the time $t_s$ of the rise period ↑ SLOPE and the laser output ratio $r_1$ of the first flash period FLASH1.

With respect to the waveforms ($L_1$, $L_2$, $L_3$) after the rise, various waveforms can be selected by selecting appropriate values as the set values of the time ($t_1$, $t_2$, $t_3$) and the laser output ratios ($r_1$, $r_2$, $r_3$) of the flash periods FLASH1, FLASH2 and FLASH3.

The waveform upon the fall, i.e., the downslope waveform section $L_e$ can be adjustable to desired angle of inclination and fall time by selecting appropriate values as the set values of the laser output ratio $r_3$ of the last flash period FLASH3 and the time $t_e$ of the fall section ↓ SLOPE.

FIGS. 18A to 18F illustrate by way of example other waveform patterns which can be set in the FIX mode of this embodiment.

Figure 18A:
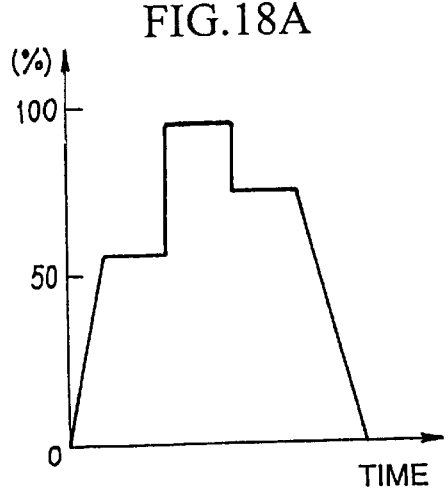
FIGS. 18A to 18F illustrate examples of the waveform patterns of a reference waveform which can be set in the FIX mode of the embodiment.
Figure 18B:
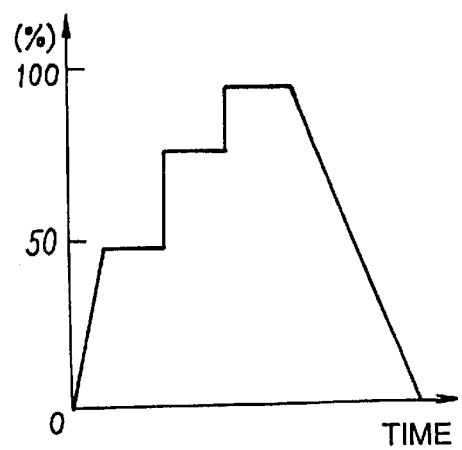
Figure 18C:
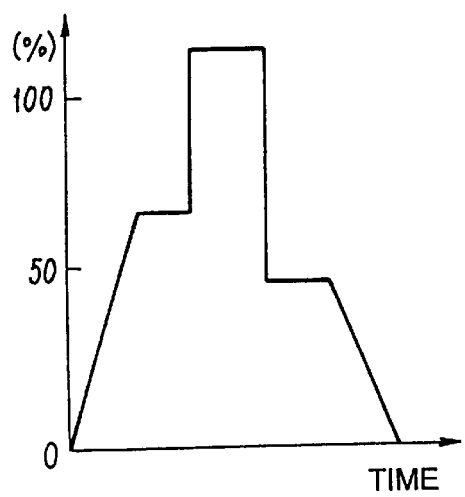
Figure 18D:
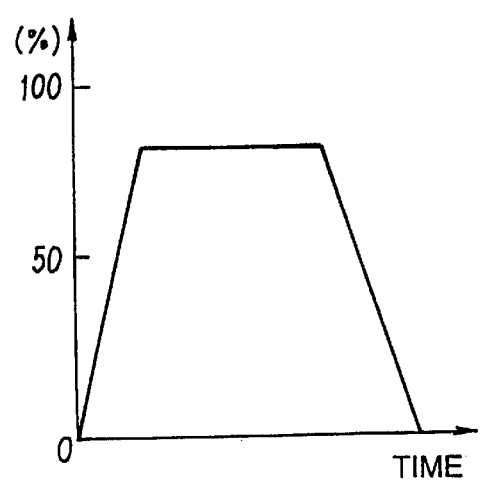
Figure 18E:
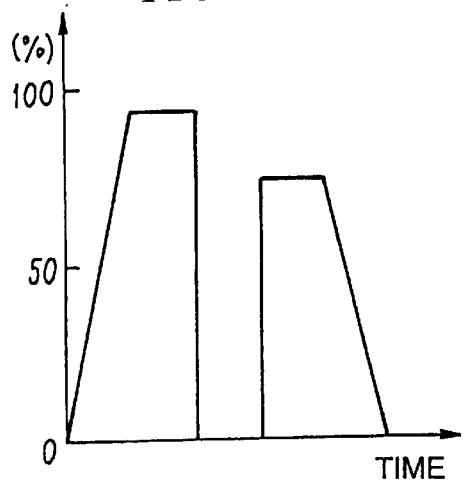
Figure 18F:
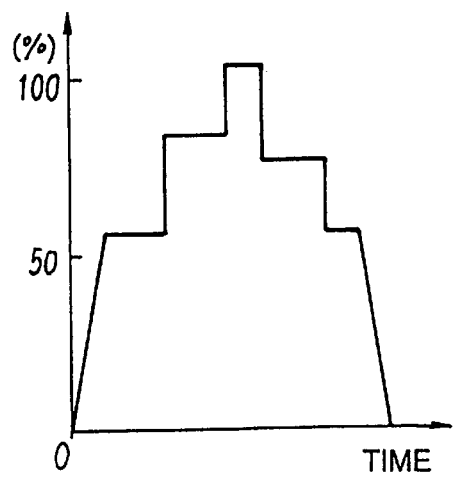

It is to be appreciated that the pattern example of FIG. 18F can be created by use of five flash periods FLASH. In spite of the increase in the number of the flash periods FLASH in this manner, the laser output value for each period is set as a ratio relative to the laser output reference value PEAK. Furthermore the reference waveform graph appears on the screen. It is therefore easy for the user to compare the waveform section in each period with the waveform section in the other period or to consider respective weights in the entire reference waveform so that the user can create the reference waveform having a desired waveform pattern on the screen.

It is to be noted that in a case of an increase in the number of the flash periods FLASH in spite of the FIX mode, use can be made of a screen scroll function similar to that in FREE mode which will be described later.

The laser output of each section of the reference waveform can be obtained immediately from the product of the laser output ratio r of the waveform section in each period and the laser output reference value PEAK. In case the user wants to change the laser output of the entire waveform of the pulse laser beam LB as a result of a change in the thickness of the workpiece, it is sufficient to alter only the set value of the laser output reference value PEAK, with no need for individual modification of the laser output value of each section of the reference waveform.

In this case, as shown in FIGS. 16A and 16B, only the set value of the laser output reference value PEAK varies on the SCHEDULE screen, with no change in the waveform pattern of the reference waveform graph displayed on the screen. In other words, although the laser output value of each section in the reference waveform for waveform control varies, the reference waveform for graphic representation does not change since each section has the same percentage (%) value.

It is also possible to locally change the laser output of each section at will by rewriting the value of the laser output ratio r of each flash period as set forth hereinabove.

Description will now be made of the FREE mode in this embodiment.

In the FREE mode, to set and enter the reference waveform for waveform control, as shown in FIG. 7, the time t and the laser output ratio r are set into items of a plurality of waveform pass points POINT1, POINT2, POINT3, POINT4, . . . , in addition to the setting of the laser output reference value PEAK.

Considerable number of, e.g., 20 waveform pass points POINT which can be set are prepared. Although five points are only displayed at a time on the screen, all of the waveform pass points can be displayed by means of the screen scroll system. When desiring to scroll the screen downward, the user sets the cursor to the position of ▲ and presses a cursor key 24c for downward movement, whereas when desiring to scroll the screen upward, the user set a the cursor to the position of ▼ and presses a cursor key 24a for upward movement. The apparatus executes the screen scroll in the cursor movement processing (step B6).

In the case of the FREE mode, numerical values are entered into the items for the setting of the reference waveform as well. The user moves the cursor to a data entry position for each item and operates the plus (+) key 26 or the minus (−) key 28 to set a desired numerical value and presses the enter key 30. In response to these key operations, the CPU 70 executes the numerical value entry display and setting processing similar to the case of the FIX mode as described above and stores the thus entered set value data at a predetermined storage address within the set value storage unit 100 (FIG. 19).

In the setting example of FIG. 7, the laser output reference value PEAK is set to 10.0(kW) and the time and laser output ratio [t, r] of the five waveform pass points POINT1, POINT2, POINT3, POINT4 and POINT5 are set respectively to [5 (ms), 90(%)], [7 (ms), 70(%)], [12 (ms), 88(%)], [15 (ms), 68(%)] and [18 (ms), 0(%)]. Ordinarily, 0(%) is imparted to the laser output ratio r of the last point terminating the reference waveform.

Referring to FIG. 20, the reference waveform in the FREE mode is defined as a line graph joining a plurality of waveform pass points POINT1, POINT2, . . . which have been set and entered on the coordinates with X axis representing the time and with Y axis representing the % value.

The rise section of this reference waveform, i.e., the upslope waveform section is determined by the time and laser output ratio ($t_1$, $r_1$) of the first point POINT1. The downslope waveform section is defined by the time and laser output ratio ($t_4$, $r_4$) of the second last point (the POINT4 in the example of FIG. 7) and by the time ($t_5$) of the last point (POINT5). The intermediate waveform sections between the upslope waveform section and the downslope waveform section are freely selected by the combination of coordinate points (t, r) of all the points POINT1, POINT2, etc. Increase in the number of points used enables a finer waveform pattern approximate to a curve to be created.

In the case of the FREE mode as well, a reference waveform graph is first obtained in % value representation and then the laser output ratio r of each point of this reference waveform graph is multiplied by the laser output reference value PEAK to obtain the reference waveform for waveform control.

The thus obtained reference waveform graph and data on the reference waveform for waveform control are also stored separately in predetermined storage areas within the set value storage unit 100. In the case of the FREE mode as well, by specifying ON as the graph ON/OFF selection item indicated by a graphic symbol, it is possible to see a waveform pattern of the set and entered reference waveform in the form of a reference waveform graph on the screen (FIG. 7).

In case the user wants to partially alter the once set reference waveform, the cursor is moved to the data position of the associated point POINT. At that time, identification display may be made of the point of the reference waveform graph corresponding to the point POINT at which the cursor is positioned, in the form of, e.g., a flashing display (or a specific color display) as shown in FIG. 17B.

Although the preferred embodiments have been described hereinabove, the present invention is not limited to the above embodiments but may be variously modified or changed within the scope of its technical idea. For example, a mouse or a tablet may be used as the set value entry means.

In order to set the reference waveform for waveform control, the above embodiments set and entered the laser output reference value PEAK, waveform sections or element data (t, r) for the laser output of the pulse laser beam. However, with respect to electrical parameters such as a lamp current, a lamp voltage or a lamp power of the laser power supply unit 42 corresponding to the laser output of the pulse laser beam, it is also possible to set and enter desired reference values and waveform element data in the same manner as the above embodiments. In that event, on the "schedule" screen there may appear switchingly the unit (A, V, W) of the reference value PEAK in accordance with the type of the set and entered electrical parameters.

The invention is not limited to the embodiment described and shown. Various other modification can be made within the scope of the invention.

What is claimed is:

1. A laser processing apparatus comprising:
    laser oscillation means for oscillating and outputting pulse laser beams;
    laser power supply means for supplying electric power for laser oscillation to said laser oscillation means;
    reference value setting means for setting reference values for one of laser outputs of the pulse laser beams and electrical parameters of said laser power supply means corresponding to the laser outputs of the pulse laser beams;
    waveform section setting means for setting, as values of ratios relative to the reference values one of laser output values electrical electrical parameter values of a plurality of waveform sections that constitute a reference waveform used for waveform control for the output of the pulse laser of beams and the electric parameters;
    reference waveform generation means for generating waveform data representative of the reference waveform on the basis of the reference values which have been set by said reference value setting means and of the ratios relative to the reference values of the plurality of waveform sections which have been set by said waveform section setting means; and
    waveform control means for controlling said laser power supply means in such a manner that the one of the output of the pulse laser beams and the electric parameters conform to the reference waveform imparted by said reference waveform generation means.

2. The laser processing apparatus according to claim 1, wherein said waveform section setting means comprises:
    pulse period setting means for dividing and setting a pulse width of the reference waveform into a plurality of periods, each of the plurality of periods having an arbitrary time; and
    ratio setting means for setting one of a laser output value and an electrical parameter value of each of the plurality of periods in the form of a value of a ratio relative to a reference value for laser output.

3. The laser processing apparatus according to claim 2, wherein said reference waveform generation means comprises upslope generation means for acquiring an upslope waveform section of the reference waveform from a time of a first period among the plurality of periods and from a time and a laser output value or an electrical parameter value of a second period and from the reference value.

4. The laser processing apparatus according to claim 2, wherein said reference waveform generation means comprises downslope generation means for acquiring a downslope waveform section of the reference waveform from a time and a laser output value or an electrical parameter value of a second to last period among the plurality of periods and from the reference value and from a time of a last period.

5. The laser processing apparatus according to claim 2, further comprising set value display means for displaying the reference value and set values of time, a laser output value or an electrical parameter value of a period of the plurality of periods.

6. The laser processing apparatus according to claim 2, further comprising reference waveform graph display means for displaying a reference waveform graph representative of a waveform pattern of the reference waveform.

7. The laser processing apparatus according to claim 6, wherein said reference waveform graph display means acquires the reference waveform graph on the basis of the arbitrary time of each of the plurality of periods which have been set by said pulse period setting means, and of the laser output value or the electrical parameter value of each of the plurality of periods which has been set by said ratio setting means.

8. The laser processing apparatus according to claim 1, wherein said waveform section setting means comprises:
    pass point time setting means for setting times of a plurality of pass points on a waveform of the reference waveform; and
    ratio setting means for setting a laser output value or an electrical parameter value of each of the plurality of pass points in the form of a value of a ratio relative to a reference value.

9. The laser processing apparatus according to claim 8, wherein said reference waveform generation means comprises upslope generation means for acquiring an upslope waveform section of the reference waveform from a time and a laser output value or an electrical parameter value of a first point among the plurality of pass points and from the reference value.

10. The laser processing apparatus according to claim 8, wherein said reference waveform generation means comprises downslope generation means for acquiring a downslope waveform section of the reference waveform from a time and a laser output value or an electrical parameter value of a second to last point among the plurality of pass points and from a time of a last point and from the reference value.

11. The laser processing apparatus according to claim 8, further comprising set value display means for displaying the reference value and set values of the time, a laser output value or an electrical parameter value of a pass point of the plurality of passpoints.

12. The laser processing apparatus according to claim 8, further comprising reference waveform graph display means for displaying a reference waveform graph representative of a waveform pattern of the reference waveform.

13. The laser processing apparatus according to claim 12, wherein said reference waveform graph display means is operable to acquire the reference waveform graph on the basis of the times of the plurality of pass points which have been set by said pass point time setting means, and of the laser output value or the electrical parameter value of each of the plurality of pass points which have been set by said ratio setting means.

\* \* \* \* \*